April 9, 1963  R. A. PEDUZZI, ET AL  3,084,808
HOIST

Filed Sept. 18, 1961  3 Sheets-Sheet 1

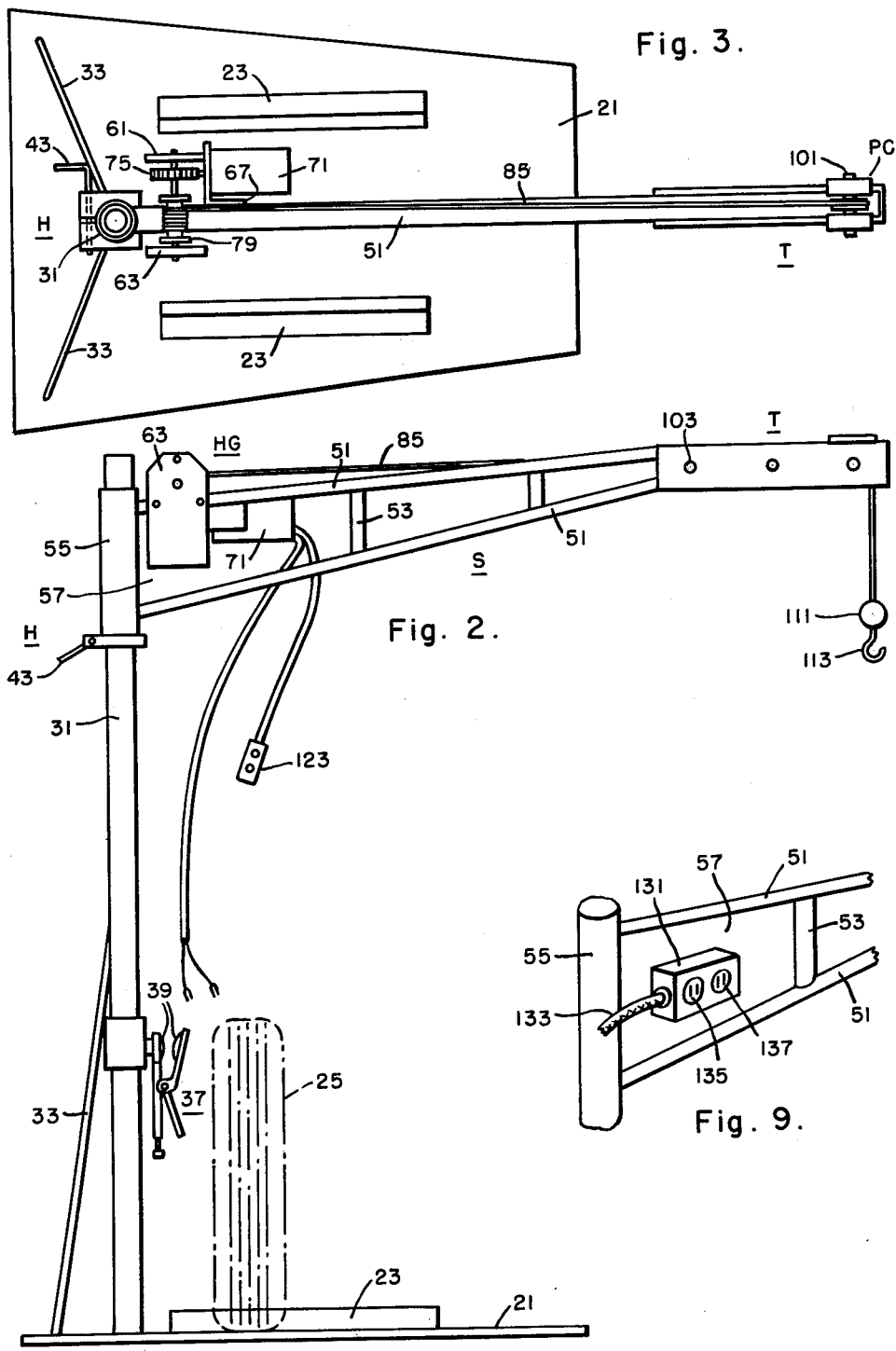

April 9, 1963  R. A. PEDUZZI ET AL  3,084,808
HOIST
Filed Sept. 18, 1961  3 Sheets-Sheet 3
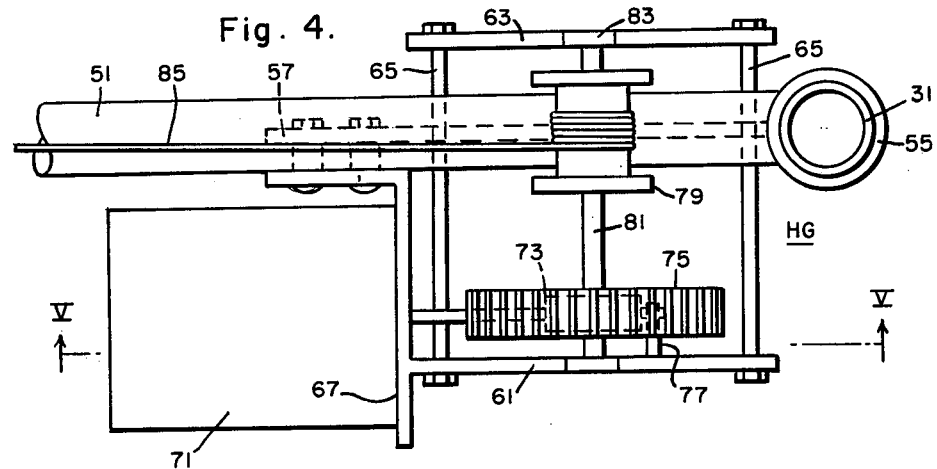
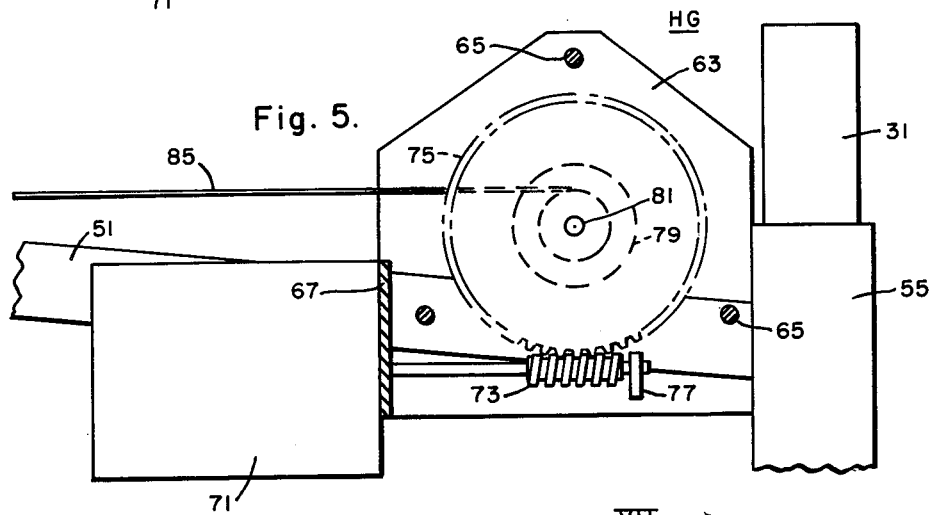
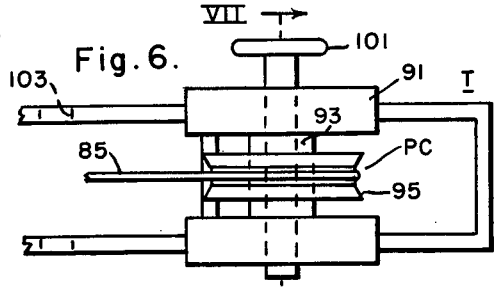
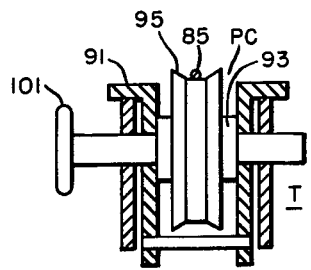
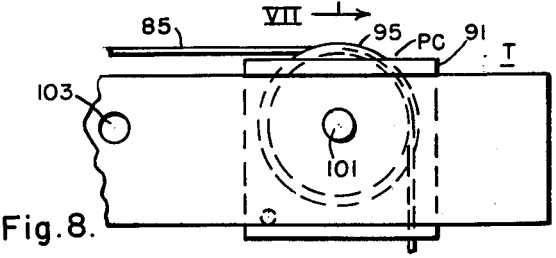

3,084,808
HOIST
Reynold A. Peduzzi, 515 7th St., and Carl J. Peduzzi,
113 Cavitte Ave., both of Trafford, Pa.
Filed Sept. 18, 1961, Ser. No. 138,829
8 Claims. (Cl. 212—63)

This invention relates to the hoist art and has particular relationship to hoists particularly for use in an automobile garage or service station in the raising or lowering of the head of the engine of an automotive vehicle. Such hoists may be used to manipulate light loads of the order of 400 or 500 pounds.

Hoists of this type in accordance with the teachings of the prior art include a base with splayed feet which extend on opposite sides of a wheel of the vehicle. An arm is suspended from an upright extending from this support and carries a cable with the end of which the head of a vehicle engine may be engaged. The arm also carries a manually actuable winding mechanism for the cable.

One of the disadvantages of a hoist of this prior-art type is that for operation, particularly in the seating of a head on the block, it requires at least two attendants; one to wind or unwind the cable and the other to control the movement of the head. The block includes a number of gaskets which are secured under the head. If the head while being lowered in advertently mars one of the gaskets it becomes necessary to regrind the surface of the block. It is essential then to avoid marring that the head be lowered slowly to the seating position and be maintained precisely parallel to the seat. This requires one attendant in addition to the operator of the winder to assure the parallelism of the head and the cooperation between the two attendants is difficult.

It is then an object of this invention to provide a hoist particularly for raising or lowering the head of an automotive engine which shall throughout its operation require only one attendant.

Another disadvantage of the prior-art hoist is that the wheels, particularly where the tires are of the balloon type, do not hold the base support with adequate firmness. The tires tend to give and this tends to permit the base support to move. A further disadvantage of the prior-art hoist is that the base may be oriented in only one way with the feet straddling the tire. This limits the placing of the cable arm in the proper position to raise the head. It is then another object of this invention to provide a hoist which shall be firmly held and which shall be capable of being oriented in the most propitious position for raising or lowering the head.

A further disadvantage of the prior-art hoist is that it is heavy and difficult to move. Rather than take the time to move the hoist to the desired position and then cooperate to remove and replace the head, the two attendants would frequently dispense with the hoist and remove and replace the head by hand. It is then a further object of this invention to provide a relatively light but strong hoist which can be moved from place to place by hand.

In accordance with this invention a hoist is provided which has a base adapted to be engaged by a wheel of the vehicle. The hoist is thus firmly positioned by the weight of the vehicle. The base may be oriented in a multitude of positions with respect to the positioning wheel so that the parts of the hoist extending from the base may be precisely positioned to raise the head depending on the form and the raised position of the hood of the vehicle.

The hoist includes in addition to the base an upright tube and a boom in the form of a tubular strut composed of longitudinal tubes with cross tubes secured to the longitudinal tubes. The boom is vertically, adjustably suspended by one of its cross tubes from the upright tube. The tubes of the boom and the upright are preferably aircraft tubing of steel and the boom and upright are light but strong. Since the boom and upright contribute substantially to the weight of the hoist, the hoist is also light.

The hoist includes head raising and lowering means suspended from a cable. The cable is wound on a winch mounted near the end of the boom adjacent the support and passes over a pulley in a carriage which may be set in different positions at the other end of the boom.

An important feature of this invention is the winding and unwinding drive for the winch. This drive includes an electric motor which is connected in driving relationship with the winch through a worm-worm-wheel speed reducing assembly. Preferably the speed reducing ratio of this assembly should be high, of the order of 100 to 1.

The motor may be of the type which is energizable directly from a commercial supply of the 110 volt 60 cycle type but in this case should be universal so that it may also be energized from commercial direct current. The motor may also be a universal motor energizeable from the vehicle battery or from an alternating commercial supply through a step-down transformer. The latter motor would be advantageous where the utmost safety to personnel is desired.

Regardless of the supply, the motor circuit is normally open and may be closed by switch means, for example a push-button or trigger switch, which retracts to the open position unless positively held closed. When the switch means is permitted to retract to the open position while the motor is running the worm-worm-wheel assembly immediately stops the motor. The hoist may then be operated by a single attendant. This attendant holds the switch means in one hand and positions the head with the other. By repeatedly closing and reopening the switch means while guiding the head the attendant may ease the head to a position parallel to, and just above, the block. He may then insert the bolts into the block through the head and then ease the head into its seat.

The boom is readily removeable from the upright and may be removed and set in upright supports provided at convenient points throughout the working area. The boom may then be used to raise a load such as a transmission from floor to bench or to lower a load from bench to floor.

The novel features considered characteristic of this invention are disclosed generally above. For a more detailed understanding of this invention both as to its organization and as to its method of operation together with additional objects and advantages thereof, reference is made to the following description taken in connection with the accompanying drawings, in which:

FIG. 2 is a view in side elevation and FIG. 3 a view in top elevation of the embodiment shown in FIG. 1;

FIG. 4 is a view in top elevation with the housing shown sectioned of the motor drive of this embodiment;

FIG. 5 is a view in side elevation of this motor drive;

FIG. 6 is a fragmental view showing the pulley carriage of this embodiment;

FIG. 7 is a section taken along line VII—VII of FIG. 6;

FIG. 8 is a view in side elevation of this pulley carriage; and

FIG. 9 is a fragmental view illustrating a modification of this invention.

Figure 1:
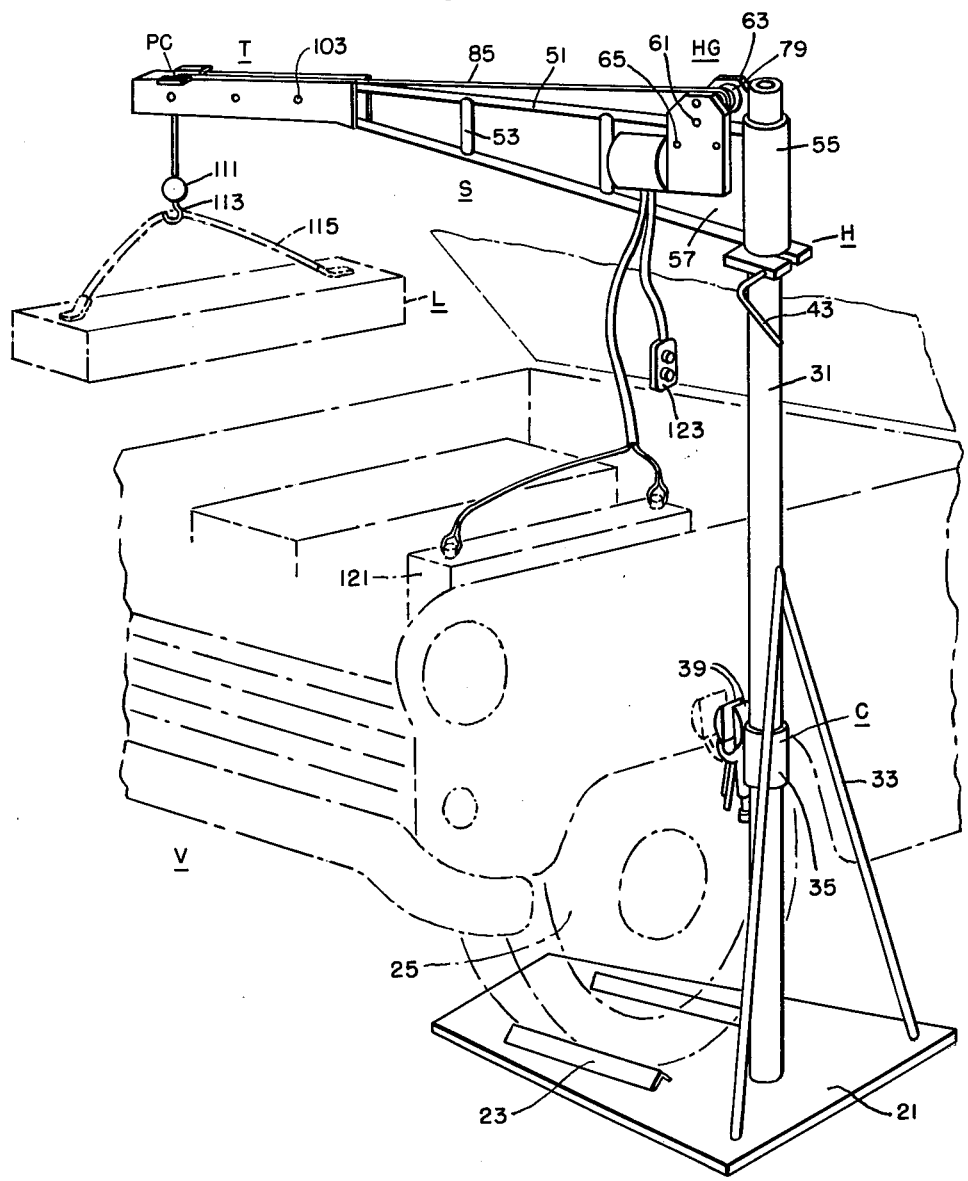
FIGURE 1 is a view in perspective showing a preferred embodiment of this invention.

The apparatus shown in the drawings includes a base, a support and a boom assembly.

The base includes a plate 21 of generally trapezoidal form which is slightly convexed upwardly. A pair of wheel chocks 23 are secured to the plate 21. These chocks 23 may be angle irons welded to the plate 21. The base is firmly positioned by the weight of a vehicle V, the wheel 25 of which is driven onto the plate 21 and between the chocks 23 in a position such that the chocks bite into the wire. The wheel 25 may be oriented in any convenient position relative to the chocks 23.

The support includes a hollow upright tube 31 welded to the plate 21 and braced by struts 33. The support also includes a clamp C which consists of a sleeve 35 slideable and rotatable on tube 31. Adjustable pliers 37 having rubber capped jaws 39 is mounted on the sleeve 35. The pliers 37 may be secured to the fender of the vehicle adjacent the wheel to prevent the tube 31 from flexing excessively under a heavy load L. The support also includes a holding means H for the boom assembly. This means includes a split plate which engages the tube 31 and may be clamped to the tube 31 in any desired position by a screw 43 which penetrates one side of the split plate and screws into a thread in the other side.

The boom assembly includes a strut S formed of longitudinal tubes 51 and cross tubes 53 which extends from a cross tube 55 that is slideable and rotatable on the tube 31 and is held in any position by the holding means H. A web plate 57 is secured by welding to the tube 55 and the adjacent portions of the tubes 51. A winch housing HG is suspended from the plate 57. The winch housing HG includes opposite plates 61 and 63 secured together and to the plate 57 by through bolts 65. A right-angle bracket 67 extends integrally from plate 61 and is bolted on one side to the plate 57 thus providing additional support for the housing HG.

The boom assembly includes a motor 71, a worm 73 rotated by the motor 71 and a worm-wheel 75 driven by the worm 73. A bearing support 77 for the worm 73 extends from the plate 61. The motor 71 is supported on bracket 67. The boom assembly also includes a winch 79 on a shaft 81 driven by the worm-wheel 75. The shaft is rotatable in bearings 83 in the plates 61 and 63. A cable 85 is wound on the winch 79.

A track T in the form of a box is welded to the end of the strut remote from the tube 55 and constitutes an extension of the boom. From this track T the pulley carriage PC is adjustably suspended.

The pulley carriage PC includes opposite angle plates 91 held together by a hollow stud 93 which serves as a bearing on which pulley 95 is rotatable. The carriage PC also includes a removeable headed pin 101 which is a slip fit through the stud 93. The track T is provided with a plurality of openings 103 into which the pin 101 is a slide fit. The pulley carriage PC may be suspended from the track T by the opposite plates 91 and may be set firmly in any one of the several positions by passing the pin 101 through the stud 93 and the openings 103.

The cable 85 passes over the pulley 95 and is connected to a steel ball 111 from which a hook 113 extends. From the hook 113 a chain 115 which may be connected to the head 11 is suspended. The ball 111 maintains the cable 85 taut when not under load.

The motor 71 is connected to the battery 121 of the vehicle V through a normally-open push button switch 123. The switch 123 is suspended in a position readily available to an operator working under the hood.

In the embodiment shown in FIG. 9 the motor is of the 110 volt A.C. or D.C. type. The motor is energized through a terminal box 131 to which the power supply conductor 133 is connected. The box 131 includes auxiliary outlets 135 and 137 which may be used to energize a light to illuminate the area under the hood and power tools such as a valve grinder.

While preferred embodiments of this invention have been disclosed herein many modifications thereof are feasible. This invention then is not to be restricted except insofar as is necessitated by the spirit of the prior art.

We claim as our invention:

1. A hoist for raising and lowering light loads of the order of several hundred pounds including a support, a boom suspended from said support, said boom including track means near the end thereof remote from said support, a winch rotatably mounted on said boom near the end thereof near said support, a motor mounted on said boom near said last-named end thereof in driving engagement with said winch, a carriage having a pulley rotatably mounted therein slideably engaging said track means, said track means including a plurality of carriage positions and said carriage including means cooperative with said track means for setting said carriage selectively in any of said positions, a cable wound on said winch and extending over said pulley, and load engaging means on the end of said cable extending from said pulley.

2. A hoist for raising and lowering light loads of the order of several hundred pounds including a support, a boom in the form of a strut formed by securing together longitudinal and cross tubes suspended from said support, said boom including track means near the end thereof remote from said support, a winch rotatably mounted on said boom near the end thereof near said support, a motor mounted on said boom near said last-named end thereof in driving engagement with said winch, a carriage having a pulley rotatably mounted therein slideably engaging said track means, said track means including a plurality of carriage positions and said carriage including means cooperative with said track means for setting said carriage selectively in any of said positions, a cable wound on said winch and extending over said pulley, and load engaging means on the end of said cable extending from said pulley.

3. A hoist for raising and lowering light loads of the order of several hundred pounds including a support in the form of an upright tube, a boom in the form of a strut formed by securing together longtiudinal and cross tubes, one of said cross tubes engaging said upright tube to suspend said boom, said boom including track means near the end thereof remote from said support, a winch rotatably mounted on said boom near the end thereof near said support, a motor mounted on said boom near said last-named end thereof in driving engagement with said winch, a carriage having a pulley rotatably mounted therein slideably engaging said track means, said track means including a plurality of carriage positions and said carriage including means cooperative with said track means for setting said carriage selectively in any of said positions, a cable wound on said winch and extending over said pulley, and load engaging means on the end of said cable extending from said pulley.

4. A hoist particularly for raising and lowering the cylinder head of an automotive behicle having wheels, said hoist comprising a base having an upper surface constructed to receive physically thereon one wheel of said vehicle with said surface directly vertically under said one wheel and surface, said base being firmly positioned when said wheel is thereon by the weight of said vehicle, said surface permitting said wheel to be oriented in any desirable position while maintaining said base firmly positioned, a support extending from said base, an assembly supported from said support and including a winch adjacent said support and a pulley outwardly from said support and a cable having head-engaging means wound on said winch and extending over said pulley, and means connected to said winch for driving said winch.

5. A hoist particularly for raising and lowering the cylinder head of an automotive vehicle having wheels, said hoist comprising a base having an upper surface constructed to receive physically thereon one of said wheels with said surface directly vertically under said one wheel in the region of engagement of said one wheel and surface, said base being firmly positioned when said one wheel is thereon by the weight of said vehicle, said surface permitting said one wheel to be oriented in any desirable position while maintaining said base firmly positioned, head engaging means, raising-and-lowering means for said head engaging means, and means connected to said base for mounting said head engaging means and said raising-and-lowering means from said base, with said raising-and-lowering means in raising-and-lowering relationship with said head engaging means.

6. A hoist particularly for raising and lowering the cylinder head of an automotive vehicle having wheels and fender assemblies adjacent said wheels, said hoist comprising a base having an upper surface constructed to have one of said vehicle wheels moved thereon to engage said surface physically with said surface directly vertically under said one wheel in the region of engagement of said one wheel and surface, said base being firmly positioned when said one wheel is thereon by the weight of said vehicle, said surface permitting said one wheel to be oriented in any desirable position while maintaining said base firmly positioned means connected to said base and to be connected to the fender assembly adjacent said one wheel for bracing said base, head engaging means, raising and lowering means for said head engaging means, and means connected to said base for mounting said head engaging means and said raising-and-lowering means from said base, with said raising and lowering means in raising-and-lowering relationship with said head engaging means.

7. A hoist particularly for raising and lowering the cylinder head of an automotive vehicle having wheels and body means adjacent said wheels, said hoist comprising a base having an upper surface constructed to receive thereon one of said wheels with said surface directly vertically under said one wheel in the region of engagement of said wheel and surface, said base being firmly positioned when said wheel is thereon by the weight of said vehicle, said surface permitting said wheel to be oriented in any desirable position while maintaining said base firmly positioned, head engaging means, raising-and-lowering means for said head engaging means, means connected to said base for mounting said head engaging means and said raising-and-lowering means from said base, with said raising-and-lowering means in raising-and-lowering relationship with said head engaging means, said mounting means including an upright member, and means connected to said upright member for engaging said body means adjacent said one wheel to support said upright member against excessive flexing by the weight of said head.

8. A hoist particularly for raising and lowering the cylinder head of an automotive vehicle having wheels and body means adjacent said wheels, said hoist comprising a base having an upper surface constructed to receive thereon one of said wheels with said surface directly vertically under said one wheel in the region of engagement of said wheel and surface, said base being firmly positioned when said wheel is thereon by the weight of said vehicle, said surface permitting said wheels to be oriented in any desirable postion while maintaining said base firmly positioned, head engaging means, raising-and-lowering means for said head engaging means, means connected to said base for mounting said head engaging means and said raising-and-lowering means from said base, with said raising-and-lowering means in raising-and-lowering relationship with said head engaging means, said mounting means including an upright member, and means connected to said upright member for engaging said body means adjacent said one wheel to support said upright member against excessive flexing by the weight of said head, said engaging means being adjustable so that it may be set to correspond to the height of said body means above said base and the thickness of said body means.

References Cited in the file of this patent

UNITED STATES PATENTS

| 2,447,073 | Kreutzer | Aug. 17, 1948 |
| 2,565,091 | Reed | Aug. 21, 1951 |
| 2,616,575 | Sila | Nov. 4, 1952 |
| 2,710,975 | Stoen et al. | June 21, 1955 |
| 2,858,946 | Breed | Nov. 4, 1958 |
| 2,859,881 | Coryell | Nov. 11, 1958 |